United States Patent
Simons et al.

[11] Patent Number: 5,561,354
[45] Date of Patent: Oct. 1, 1996

[54] HORIZONTAL DEFLECTION

[75] Inventors: Henricus L. Simons; Dirk J. A. Teuling; Jozef J. M. Hulshof, all of Eindhoven, Netherlands

[73] Assignee: U.S. Philips Corporation, New York, N.Y.

[21] Appl. No.: 504,283

[22] Filed: Jul. 19, 1995

[30] Foreign Application Priority Data

Jul. 19, 1994 [EP] European Pat. Off. .............. 94202105

[51] Int. Cl.$^6$ .............. H01J 29/70; H01J 29/76
[52] U.S. Cl. .............. 315/408; 315/411
[58] Field of Search ..................... 315/411, 408

[56] References Cited

U.S. PATENT DOCUMENTS

| | | | |
|---|---|---|---|
| 4,546,388 | 10/1985 | Williams, Jr. .............. | 315/411 |
| 5,093,605 | 3/1992 | Meinertz ................. | 315/411 |

FOREIGN PATENT DOCUMENTS

| | | | |
|---|---|---|---|
| 3527000 | 2/1987 | Germany ..................... | H02M 3/335 |
| 4021940 | 1/1992 | Germany .......................... | H04N 5/63 |

OTHER PUBLICATIONS

"A Universal Power Supply Integrated Circuit For TV and Monitor Applications" by Philippe Maige, SGS–Thomson Microelectronics, Grenoble, France, IEEE Transactions on Consumer Elect. vol. 36, No. 1, Feb. 1990, pp. 10–17.

"Erhohte Betriebssicherheit und Niedrigere Kosten" by Wilfried Blaesner, Stromversorgung, Elektronik 9/27.4.1990, pp. 134–140.

*Primary Examiner*—Theodore M. Blum
*Attorney, Agent, or Firm*—Edward W. Goodman

[57] ABSTRACT

In order to cause scan and/or fly-back voltages (Vsca, Vfly) supplied by a horizontal output stage (1) to vary at a desired rate during a change of state in a horizontal deflection circuit (1, 2, 4), a feedback circuit (4) is provided. This feedback circuit (4) processes the scan and/or fly-back voltages (Vsca, Vfly) to a control voltage (Vco) with which a duty cycle (dc) of a drive signal (Hdr) of a switching element (Tr) in the horizontal output stage (1) is influenced.

11 Claims, 7 Drawing Sheets

HORIZONTAL DEFLECTION

BACKGROUND OF THE INVENTION

1. Field of the Invention

The invention relates to a horizontal deflection circuit for a picture display apparatus, comprising:

a horizontal output stage provided with a switching element which is coupled to a horizontal output transformer for generating at least one voltage, and a drive circuit for generating a drive signal for switching the switching element, and provided with a duty cycle control circuit for modulating a duty cycle, of the drive signal during changes of state of the horizontal deflection circuit.

The invention also relates to a method of horizontally deflecting a cathode ray of a picture display tube, and to a picture display apparatus provided with the horizontal deflection circuit.

2. Description of the Related Art

Such a horizontal deflection circuit is known from German Patent Application DE-A-4021940, corresponding to U.S. Pat. No. 5,381,329. This Application describes a power supply circuit in which a switching element (a transistor in this case) is coupled to a power supply transformer and a horizontal output transformer. Such a power supply circuit, which is known as Wessel circuit, supplies power supply voltages by means of the power supply transformer and a horizontal deflection current, fly-back voltages and/or scan voltages by means of the horizontal output transformer. In normal operation, the power supply circuit, further referred to as combined circuit, generates a drive signal of which one edge is used for fixing a switch-off instant of the switching element. This switch-off instant initiates a horizontal fly-back, and is controlled in normal operation by what is generally referred to as a phi2-control circuit. To this end, the drive circuit compares instants of occurrence of fly-back pulses supplied by the horizontal output stage and related to the horizontal fly-back, on the one hand, with instants of occurrence of the horizontal synchronizing pulses, on the other hand. A possible difference in instants of occurrence is corrected so that the video signal is displayed at the correct horizontal position on the display tube.

During a described change of state from stand-by operation to normal operation, a duty cycle of the drive signal is controlled so as to continuously increase an on-time of the switching element from a small value to a nominal value. With such a variation of the duty cycle, the switching element is protected from a too large dissipation. However, a duty cycle modulation, as used in the combined circuit, does not provide the possibility of having a variation of voltages generated by the combined circuit during the change of state to satisfy various requirements imposed by different components that are coupled to the scan and fly-back voltages.

SUMMARY OF THE INVENTION

It is, inter alia, an object of the invention to provide a horizontal deflection circuit and a method in which, during a change of state, a duty cycle variation is influenced by at least one of the voltages generated by the horizontal deflection circuit so as to satisfy the various requirements which are imposed on a variation of different voltages. The requirements referred to relate to, for example, a maximum admissible current in components connected with the voltages or a maximum admissible rate at which a voltage may vary around a specific value.

To this end, a first aspect of the invention provides a horizontal deflection circuit for a picture display apparatus, comprising a horizontal output stage provided with a switching element which is coupled to a horizontal output transformer for at least generating a voltage, and a drive circuit for generating a drive signal for switching the switching element, and provided with a duty cycle control circuit for modulating a duty cycle of the drive signal during changes of state of the horizontal deflection circuit, characterized in that the horizontal deflection circuit is provided with a feedback circuit having at least one feedback input which is coupled to an output of the horizontal output stage for receiving a DC signal which varies during said changes of state, said feedback circuit having an output for applying a control signal to a control input of the duty cycle control circuit. By an arranged feedback with a voltage generated by the horizontal output stage, a first rate of growth of the duty cycle of the drive signal determined by the maximum admissible dissipation in the switching element is changed at an instant when the variation of one of the fed-back voltages tends to reach an unwanted range. According to the invention, the control of the duty cycle variation provides the possibility of inhibiting the rate at which voltages rise at the instant when one of the components tends to violate an imposed requirement. It consequently is not necessary to choose a constant, very slow increase of the voltages, satisfying all requirements, but unnecessarily extending the duration of the change of state.

An embodiment of the horizontal deflection circuit having the characterizing feature that the DC signal is related to at least a scan voltage generated by the horizontal output transformer, provides the possibility of an accurately defined desired variation of a scan voltage, with the advantage that charging of the capacitors coupled to the scan voltage varies at a chosen second rate. Consequently, too large currents and loads are not produced in these capacitors and components arranged in series therewith such as diodes, coils, resisters or fuses. In this way, the current in a horizontal output transformer coupled to the switching element, can also be maintained below a saturation value, and the peak lead of a power supply circuit feeding the horizontal deflection circuit decreases.

An embodiment of the horizontal deflection circuit, with the characterizing feature that the DC signal s related to at least a fly-back voltage generated by the horizontal output transformer, provides the possibility of an accurately defined desired variation of a fly-back voltage. This also has the advantage that too large loads of components arranged in series with the above-mentioned capacitors, such as diodes, coils, resisters or fuses cannot be produced. To prevent flash-over in display tubes which are sensitive thereto, a desired third rate can be fixed at which the anode voltage of the display tube, which is also a fly-back voltage, increases. To this end, a voltage derived from the anode voltage or another fly-back voltage can be fed back. It is alternatively possible to reduce or eliminate the noises which may occur due to large current variations or due to a fast rise and fall of the anode voltage during switching on and switching off the picture display apparatus.

The embodiment of the horizontal deflection circuit, with the characterizing feature that the feedback circuit is provided with change detector means coupled to the feedback input for supplying output signals which are a measure of a change of the DC signal, has the advantage that only the variation in DC signals is fed back, with which in normal operation, in which the DC signals have reached their final value, the feedback does not have any influence on the duty cycle control.

An embodiment of the horizontal deflection circuit, with the characterizing feature that the feedback circuit is further provided with a threshold circuit arranged between the feedback input and the change detector means, provides the possibility of limiting the variation of a scan or fly-back voltage above a level determined by a threshold circuit at a fourth rate. This provides the advantage of obtaining an extra slow increase of the anode voltage above this level which is necessary for display tubes which are sensitive to flash-over during a rise of the anode voltage close to a final value.

These and other aspects of the invention will be apparent from and elucidated with reference to the embodiments described hereinafter.

DESCRIPTION OF THE PREFERRED EMBODIMENTS

Figure 1:
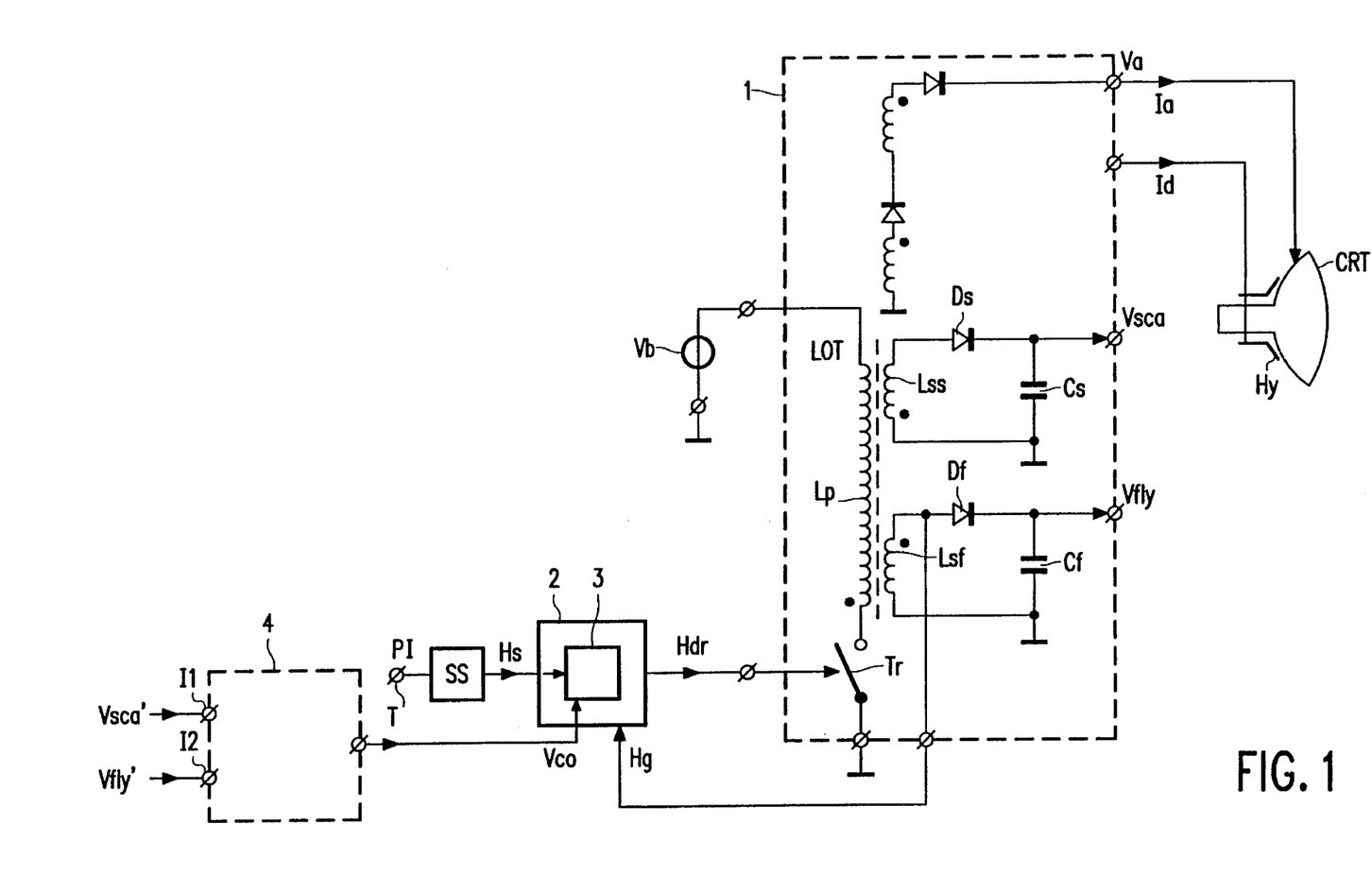
FIG. 1 shows a picture display apparatus provided with a horizontal deflection circuit according to the invention.

FIG. 1 shows a picture display apparatus comprising a display tube CRT and a horizontal deflection circuit 2, 1, 4 according to the invention. Presented from a video signal PI to an input terminal T, horizontal synchronizing pulses Hs are separated by means of a synchronizing signal separator SS. The pulses Hs are presented to a drive circuit 2 for generating a drive signal Hdr related thereto during normal operation and to be applied to a horizontal output stage 1 for switching a switching element Tr. The switching element Tr is coupled to a primary winding Lp of a horizontal or line output transformer LOT. The horizontal output transformer LOT comprises one or more secondary windings for supplying one or more fly-back voltages Vfly and/or scan voltages Vsca; for the sake of clarity, a secondary winding Lss for supplying a scan voltage Vsca and a secondary winding Lsf for supplying a fly-back voltage Vfly are shown in FIG. 1. For supplying the scan and fly-back voltages Vsca, Vfly, diodes Ds, Df are connected to the secondary windings Lss, Lsf, respectively, in such a way that they conduct during a scan period of time and during a fly-back period of time of a horizontal period, respectively. Moreover, capacitors Cs, Cf may be arranged and connected between the diodes Ds, Df and ground, respectively. The capacitors Cs, Cf ensure that the scan and fly-back voltages Vsca, Vfly are smoothed. Scan voltages Vsca are generally used for feeding other circuits present in the picture display apparatus and not shown in the Figure. The scan voltages Vsca are related to a power supply voltage Vb which is present across the primary winding Lp of the horizontal output transformer LOT if the switching element Tr is closed. Fly-back voltages Vfly are related to a primary fly-back voltage which is produced across the primary winding Lp of the horizontal output transformer LOT at the instant when the switching element Tr opens. Since the fly-back period of time (for example, 11 µs) is much shorter than the scan period of time (for example, 53 µs), the primary fly-back voltage is many times larger (approximately 8 times) than the power supply voltage Vb and hence eminently suitable for generating high voltages such as an anode voltage Va for the display tube CRT.

The switching element Tr may be any suitable semiconductor components such as a bipolar transistor, a FET, A thyristor, or an IGBT (Insulated Gate Bipolar Transistor) whose control electrode is connected to the drive signal Hdr via a suitable drive circuit. Generally, a diode parallel to the switching element Tr is connected to ground by its anode and to the primary winding Lp by its cathode. Moreover, the known horizontal output stage 1 is coupled to horizontal deflection coils Hy for deflecting electron beams of the display tube CRT; to this end, the horizontal output stage 1 generates a horizontal deflection current Id in a known manner not shown in the Figure. The horizontal output stage 1 has two terminals which are connected to terminals of the power supply source Vb. In normal operation, the drive circuit 2 compares instants of occurrence of fly-back pulses Hg supplied by the horizontal output stage 1 and related to a horizontal fly-back, on the one hand, with instants of occurrence of the horizontal synchronizing pulses Hs, on the other hand, by means of what is generally referred to as a phi2-control circuit. A possible difference between instants of occurrence is corrected by the phi2-control circuit so that the video signal is displayed at the correct horizontal position on the display tube. The drive circuit 2 is provided with a duty cycle control circuit 3 for modulating a duty cycle of the drive signal Hdr generated thereby during a change of state of the horizontal deflection circuit 2, 1, 4. Examples of changes of state are: starting the horizontal output stage 1 simultaneously with the build-up of the power supply voltage Vb, starting the horizontal output stage 1 in the presence of the power supply voltage Vb, and switching off the horizontal output stage 1 after detection of flash-over in the display tube CRT. The feedback circuit 4 has two feedback inputs I1, I2 for receiving DC signals Vfly', Vsca' which are related to at least a fly-back voltage Vfly and at least a scan voltage Vsca, respectively, generated in the horizontal output stage 1, and which vary during a change of state. The feedback circuit 4 generates a control signal Vco to be supplied to a control input of the duty cycle control circuit 3.

In a known horizontal deflection circuit 2, 1, 4 in which the horizontal output transformer LOT is also used as a choke for generating the horizontal deflection current Id, the horizontal output transformer LOT will generate at least a fly-back voltage Vfly, viz. the anode voltage Va.

Another: known horizontal deflection circuit 2, 1, 4 comprises a first transformer (which is also used as the choke) for generating the horizontal deflection current Id, and a second transformer for generating the (often stabilized) anode voltage Va. In the latter horizontal deflection circuit, the horizontal output transformer LOT may be the first transformer for generating scan and/or fly-back voltages Vsca, Vfly, or the horizontal output transformer LOT may be the second transformer for generating at least the anode voltage Va. It is evident that the drive circuit 2, if coupled to the second transformer, does not need a phi2-control circuit and need not be coupled to the horizontal synchronizing pulses Hs.

The scan voltage-related DC signal Vsca' mentioned hereinbefore may be any of the scan voltages Vsca generated by the horizontal output stage 1 or a voltage related to a combination of scan voltages. Similarly, the fly-back voltage Vfly' may be any of the fly-back voltages Vfly generated by the horizontal output stage 1 or a voltage related to a combination of fly-back voltages. Alternatively, the fly-back voltage-related DC signal Vfly' may be related to the voltage across the switching element Tr.

Figure 2:
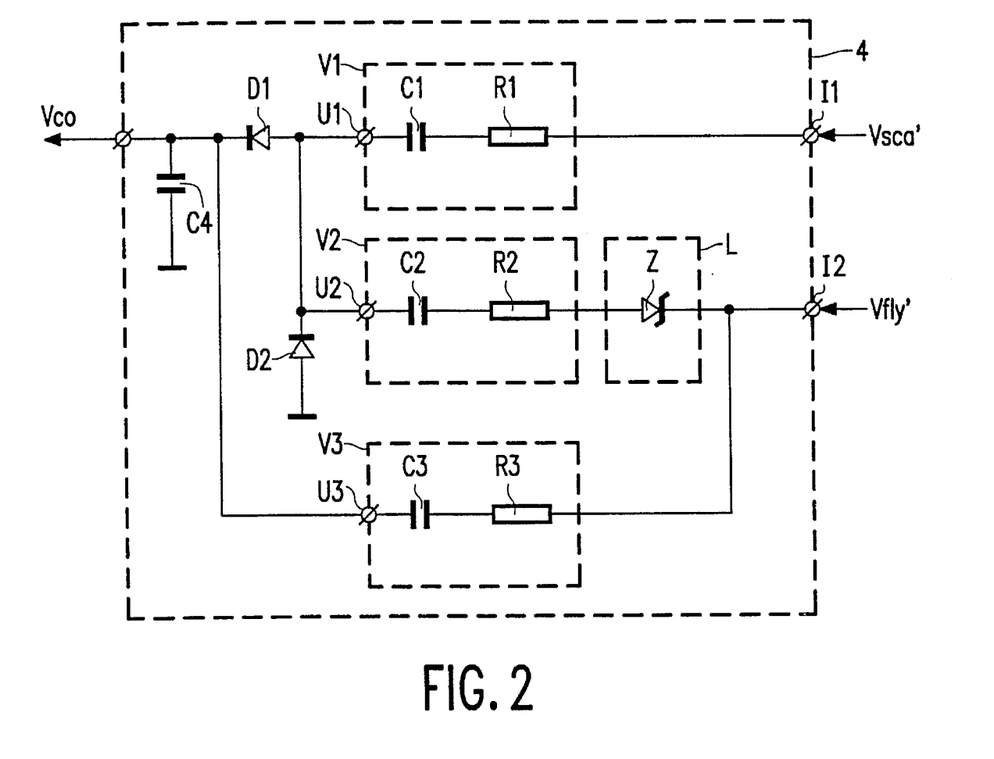
FIG. 2 is an embodiment of a feedback circuit according to the invention.

FIG. 2 shows an embodiment of a feedback circuit 4 according to the invention. A change detector V1 is coupled to the feedback input I1, an output U1 of said detector being coupled to an anode of a first diode D1 for forming a first feedback path. A change detector V2 is coupled to the feedback input I2 via a threshold circuit L, an output U2 of said detector being coupled to the anode of the first diode D1 for forming a second feedback path. Moreover, a cathode of a second diode D2 is coupled to the anode of the first diode D1, and an anode of said cathode is connected to ground. Moreover, a change detector V3 is coupled to the feedback input I2, an output U3 of said detector being coupled to a cathode of the first diode D1 for forming a third feedback path. The cathode of the first diode D1 supplies a control signal Vco and is coupled to ground by means of a fourth capacitor C4.

The change detectors V1, V2, V3 consist of series arrangements of a first resistor R1 and a first capacitor C1, a second resistor R2 and a second capacitor C2 and a third resistor R3 and a third capacitor C3, respectively. The threshold circuit may comprise a zener diode Z. For the sake of clarity, the first diode D1 will hereinafter be considered as a through-connection and the second diode D2 will be considered as an interrupted connection. In a conventional embodiment, in which the scan voltage Vsca is 45 V and the fly-back voltage Vfly is 130 V, the first resistor R1 has a value of 27 kOhm, the first capacitor C1 has a value of 10 nF, the second resistor R2 has a value of 56 kOhm, the second capacitor C2 has a value of 150 nF, the third resistor R3 has a value of 220 kOhm, the third capacitor C3 has a value of 2.7 nF and a zener voltage of 86 V is obtained by arranging two zener diodes of 39 V and 47 V in series. The operation of the feedback circuit shown will be explained with reference to FIG. 4.

Figure 3:
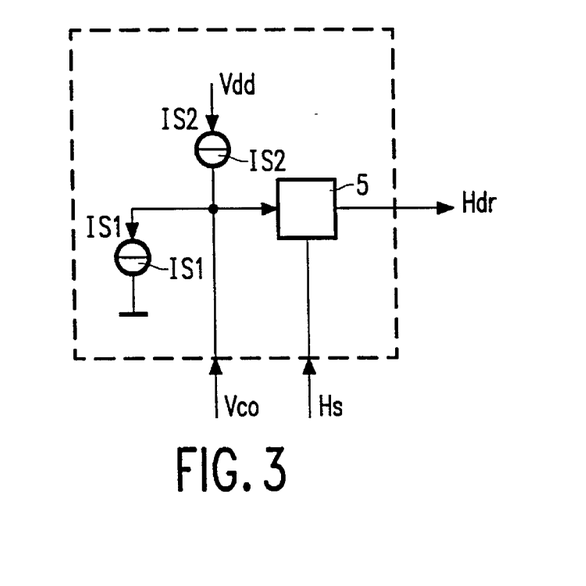
FIG. 3 is an embodiment of a part of a duty cycle control circuit according to the invention.

FIG. 3 shows an embodiment of a part of a duty cycle control circuit 3 according to the invention. A first current source IS1 is coupled to a second current source IS2 which is coupled to a power supply voltage Vdd. The junction point of the two current sources IS1, IS2 receives the control signal Vco. The other side of the first current source IS1 is coupled to ground. The designations IS1, IS2 are also used for the currents supplied by the corresponding current sources. The control signal Vco is presented to a drive circuit 5 for influencing the duty cycle of the drive signal Hdr. Moreover, the drive circuit 5 receives horizontal synchronizing pulses Hs. In normal operation, the period duration of the drive signal is related to the period duration of the horizontal synchronizing pulses Hs by means of a known phase-locked loop circuit (often referred to as phi1-loop); during changes of state this relation may be interrupted. The operation of the part of the duty cycle control circuit 3 will be explained with reference to FIG. 4.

Figure 4:
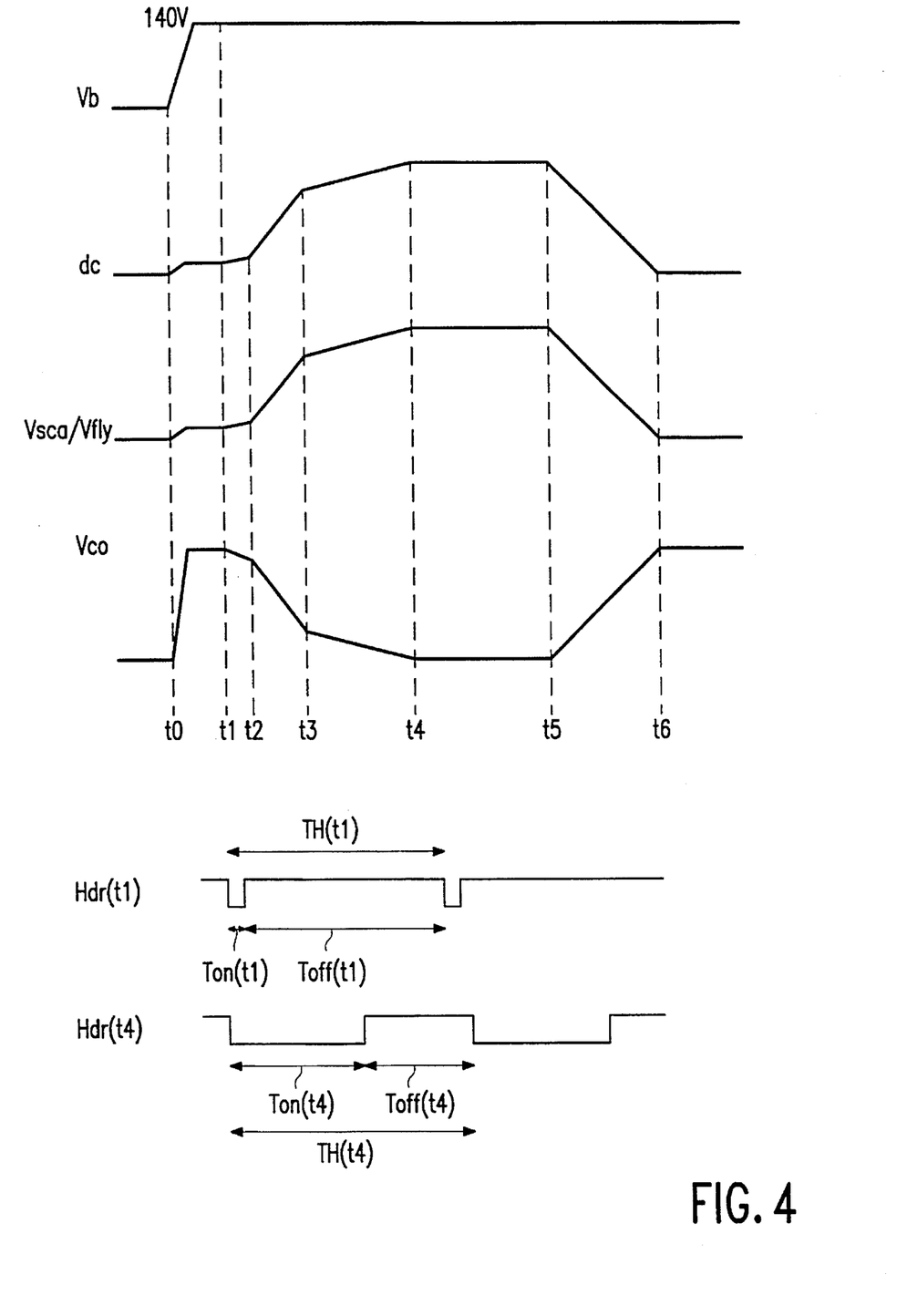
FIG. 4 shows a signal diagram to explain the operation of the embodiment of the feedback circuit and the, part of the duty cycle control circuit according to the invention.

FIG. 4 shows successively a variation of a power supply deflection voltage Vb generated by the power supply source referred to identically, the duty cycle dc, a scan voltage Vsca or a fly-back voltage Vfly, the control signal Vco and two signal waveforms of the drive signal Hdr at an instant t1 and at an instant t4, respectively. The variation of scan and fly-back voltages Vsca, Vfly is shown by means of the same curve because, in principle, they have a uniform variation but their amplitude may be different.

At the instant t0, the power supply deflection voltage Vb starts to rise, for example because a line voltage switch is closed, so as to reach a nominal value of, for example, 140 V before the instant t1. In addition to the rise of the power supply deflection voltage Vb, a power supply voltage Vdd will also rise, while the second current source IS2 is switched on and thus ensures that the fourth capacitor C4 is charged. The control signal Vco increases to a given voltage at which a small duty cycle dc of the drive signal Hdr occurs and with which a short on-time of the switching element Tr is associated. At the instant t1, the second current source IS2 is switched off and the first current source IS1 is switched on.

Without influence of the control signal Vco by one of the feedback paths, the fourth capacitor C4 is discharged at a first rate which is determined by the value of the fourth capacitor C4 and the value of the first current IS1, and consequently, the duty cycle dc will increase at a first rate. Via the first feedback path I1-U1, an increase of the scan voltage Vsca causes a charge current for the fourth capacitor C4. The value of the charge current depends on the first resistor R1, the first capacitor C1 and the fourth capacitor C4. The decrease of the voltage of the control signal Vco as a result of the discharge of the fourth capacitor C4 by the first current source IS1 is thereby inhibited. The growth of the duty cycle dc now varies at a second, slower rate until at the instant t2, the increase of the scan voltage Vsca has become so small that the duty cycle dc may further increase at the first or a third rate. If the growth of the scan voltage Vsca is sufficiently small, the charging of capacitors coupled thereto will be effected with a sufficiently small current and too large currents and loads in these capacitors and components arranged in series therewith, such as diodes, coils, resistors or fuses, do not occur. Subsequently, the rate at which the duty cycle increases is raised so as to start the TV apparatus as quickly as possible. In principle, the rate between the instants t2 and t3 is equal to the first rate, unless the charge current for the fourth capacitor C4, determined by the value of the third resistor R3, the third capacitor C3 and the fourth capacitor C4, acquires a value which is not negligible with respect to the first current IS1 as a consequence of the increase of the fly-back voltage Vfly via the third feedback path.

At the instant t3, the fly-back voltage Vfly exceeds a given threshold value which is fixed by the zener diode Z. The zener diode Z starts conducting and the second feedback path becomes active, while a further increase of the fly-back voltage Vfly causes a charge, current for the fourth capacitor C4 whose value depends on the second resistor R2, the second capacitor C2 and the fourth capacitor C4. The decrease of the voltage of the control signal Vco as a result of the discharge of the fourth capacitor C4 is inhibited thereby. The growth of the duty cycle dc now varies at the third rate until a final value of the fly-back voltage Vfly is reached at the instant t4. For display tubes in which flashover occurs at a too fast rise of the anode voltage Va close to a final value, a correct slow rate of a rise of the anode voltage Va to the final value can be obtained.

At the instant t5, a change of state from normal operation to stand-by operation is started. In connection with safety requirements imposed on the maximum residual value of the anode voltage Va, it is desirable that the horizontal deflection and the scan and fly-back voltages Vsca, Vfly generated by the horizontal output stage 1 do not decrease so rapidly that there is insufficient time available for discharging the display tube CRT. The first current source IS1 is switched off and the second current source IS2 is switched on, the fourth capacitor C4 is charged slowly, with which the duty cycle dc decreases slowly. By impressing a desired anode current Ia during the decrease of the duty cycle, the anode voltage Va will also decrease slowly, and no special expensive provisions are required such as a high-voltage resistor connected to the anode voltage for discharging the display tube CRT.

During the decrease of scan and fly-back voltages Vsca, Vfly, the first diode D1 prevents the first (I1-U1), and the second (I2-U2) feedback path from having any influence on the decrease of the duty cycle, while the second diode D2 enables the first (C1) and the second (C2) capacitor to be discharged.

The two signal waveforms shown of the drive signal Hdr elucidate the variation of the duty cycle de. The drive signal Hdr is generally a two-level pulse and in this example the switching element Tr is closed (or is conducting) during a low level and opened (or blocked) during a high level. The signal waveform Hdr(t1) of the drive signal Hdr at the instant t1 shows a small duty cycle dc, the switching element Tr has a short on-time Ton(t1) and a long off-time Toff(t1). The repetition period TH(t1) of the drive signal Hdr is the sum of the on-time Ton(t1) and the off-time Toff(t1). The signal waveform Hdr(t4) of :the drive signal Hdr at the instant 14 shows a nominal duty cycle dc(t4), the switching element Tr has a nominal on-time Ton(t4) and a nominal off-time Toff(t4). The nominal repetition period TH(t4) of the drive signal Hdr is the sum of the nominal on-time Ton(t4) and the nominal off-time Toff(t4).

The measures proposed provide the above-mentioned advantages: protection of the series-arranged components such as diodes Ds, Df, coils, resistors or fuses from too large charge currents of the capacitors Cs, Cf, preventing saturation of the horizontal output transformed: LOT by too large charge currents and a slow growth of the anode voltage Va so as to prevent flash-over in the display tube CRT for both a duty cycle control in which the on-time Ton of the switching element is modulated at a constant off-time Toff, hence at a variable frequency of the drive signal Hdr (as shown in FIGS. 5A to 5E), and for a duty cycle control in which the on-time and the off-time of the switching element are modulated so as to obtain a drive signal Hdr of constant frequency (as shown in FIGS. 6A to 6E). In the latter case, the feedback with a fly-back voltage Vfly has the additional advantage that a linear relation between the duty cycle dc and the value of the fly-back voltage Vfly is established so that spurious oscillations in the horizontal output stage 1 are prevented.

Figure 5A:
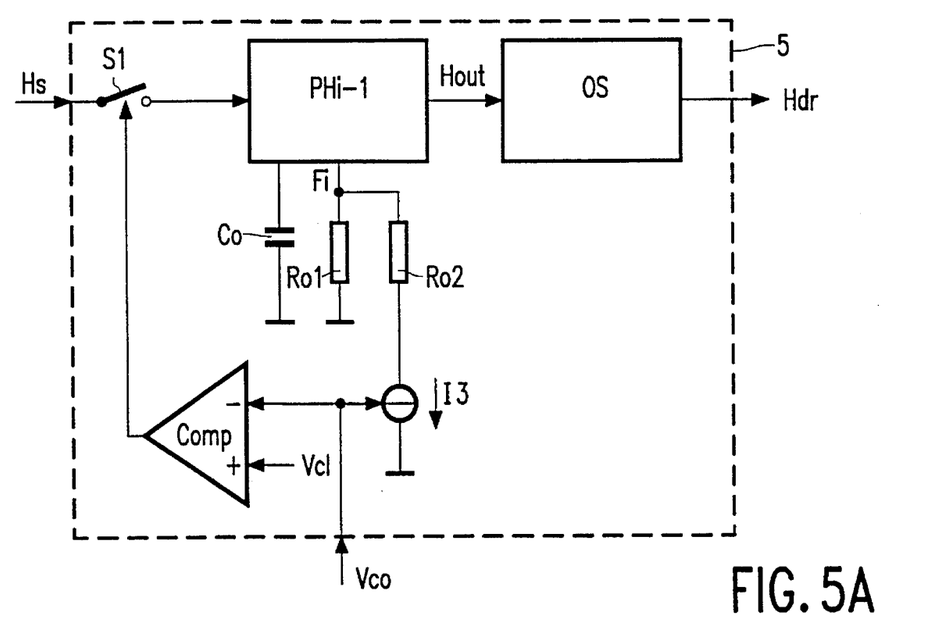
FIG. 5A shows a first embodiment of the drive circuit and FIGS. 5B–5E show some signal diagrams to explain its operation.

FIG. 5A shows a first embodiment of the drive circuit 5. This embodiment generates an on-time Ton modulated with the control signal Vco and a constant off-time Toffc of the drive signal Hdr. As a result, a period duration (or repetition frequency) of pulses of the drive signal Hdr varies. The horizontal synchronizing pulses Hs are presented to a first switch S1 arranged in series with an input of a phase-locked loop circuit phi-1. The phase-locked loop circuit phi-1 is further coupled to a capacitor Co, a first resistor Ro1 and a second resistor Ro2 and supplies an output pulse Hout. The known phase-locked loop circuit phi-1 (for example, arranged in the Philips IC TDA2595) will couple the; output pulse Hout in frequency and phase with the horizontal synchronizing pulses Hs presented to the input when switch S1 is closed. When the switch is opened, the phase-locked loop circuit phi-1 does not receive input pulses and then supplies output pulses Hout having a free-running frequency. The free-running frequency is determined by the capacitor Co, the first resistor Ro1 and the second resistor Ro2 arranged in series and connected to ground by means of a current source I3. The current source I3 supplies a current I3 which is dependent in value on the control signal Vco. The switch S1 is controlled by the output signal of a voltage comparator Comp which receives the control signal Vco at an inverting input and a noninverting input of which is connected to a first reference voltage Vcl. A time-determining circuit OS (for example, a retriggerable multivibrator (one shot)) receives the output pulse Hout and supplies the drive signal Hdr. The drive signal Hdr has a high level from each rising edge of the output pulse Hout during the constant off-time Toffc. The operation of the drive circuit 5 will be elucidated with reference to an example of a variation of the control signal Vco as shown in FIG. 5B, and the waveform diagrams of the control signal Vco, the output pulse Hout and the drive signal Hdr in FIGS. 5C to 5E.

Figure 5B:
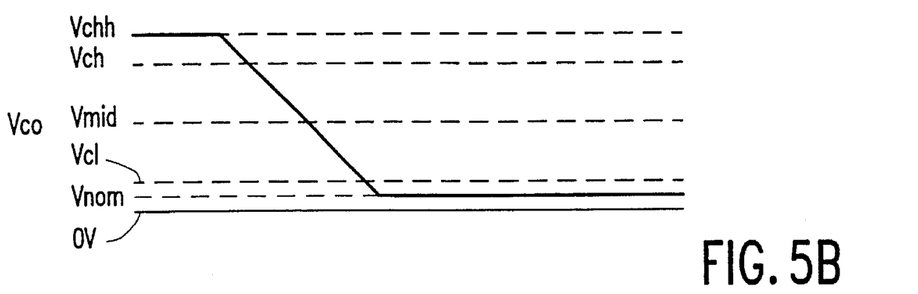

FIG. 5B shows a variation of the control signal Vco as occurs, for example when starting a horizontal deflection circuit in case smoothing capacitors Cs, Cf are still uncharged, or without the smoothing capacitors Cs, Cf. The control signal Vco decreases from a limited maximum voltage Vchh to a nominal voltage Vnom and successively intersects a second reference voltage Vch, a voltage Vmid and the first reference voltage Vcl.

Figure 5C:
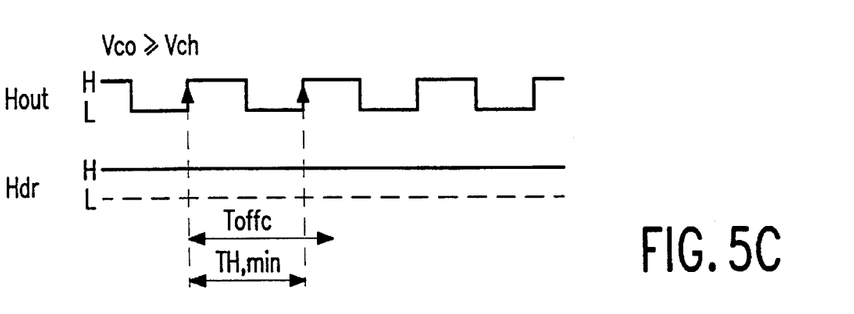

FIG. 5C shows a situation in which the control voltage Vco has a value which is equal to (or higher than) the second reference voltage Vch, the switch S1 is open and the current source I3 supplies a maximum current, with the output signal Hout having a maximum repetition frequency. Since the constant off-time Toffc is larger in this case than the repetition frequency (1/TH,min) of pulses in the output signal Hout, the drive signal Hdr will have a continuously high level H and the switching element Tr is continuously opened.

Figure 5D:
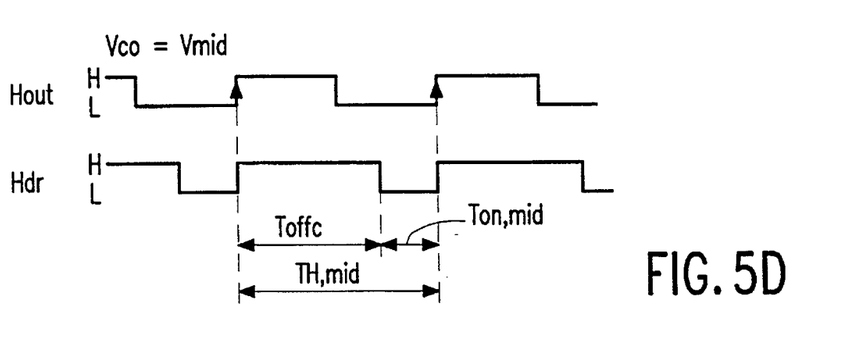

FIG. 5D shows a situation in which the control voltage Vco has a value which is equal to the voltage Vmid, the switch S1 is open and the current source I3 supplies a current having a value between zero and the maximum current, with the output signal Hout having a repetition frequency between the maximum value and a nominal value. The drive signal Hdr has a low level L during an on-time Ton,mid, a high level H during the constant off-time Toffc determined by the time-determining circuit OS, and a period duration TH,mid.

Figure 5E:
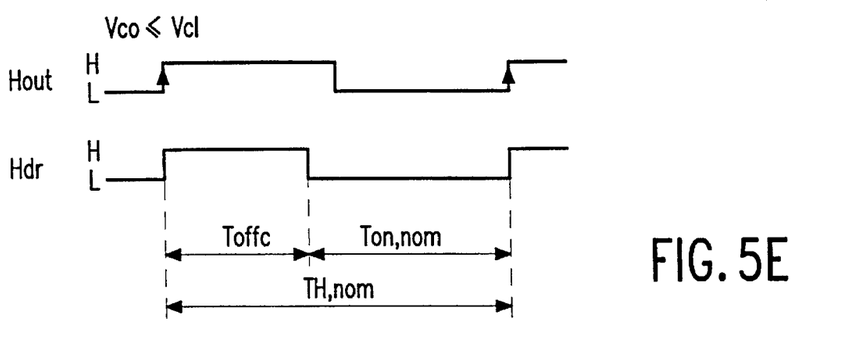

FIG. 5E shows a situation in which the control voltage Vco has a value which is equal to (or lower than) the first reference voltage Vcl, the current source I3 does not supply a current, with the output signal Hout having the nominal repetition frequency determined by the capacitor Co and the first resistor Ro1. The drive signal Hdr has a low level L, during a nominal on-time Tnom, a high level H during the constant off-time Toffc determined by the time-determining circuit OS, and a nominal period duration TH,nom. Since the control signal Vco now has a value below the first reference voltage Vcl, the switch S1 will be closed via the voltage comparator Comp and the horizontal deflection circuit has reached its normal operating situation.

Figure 6A:
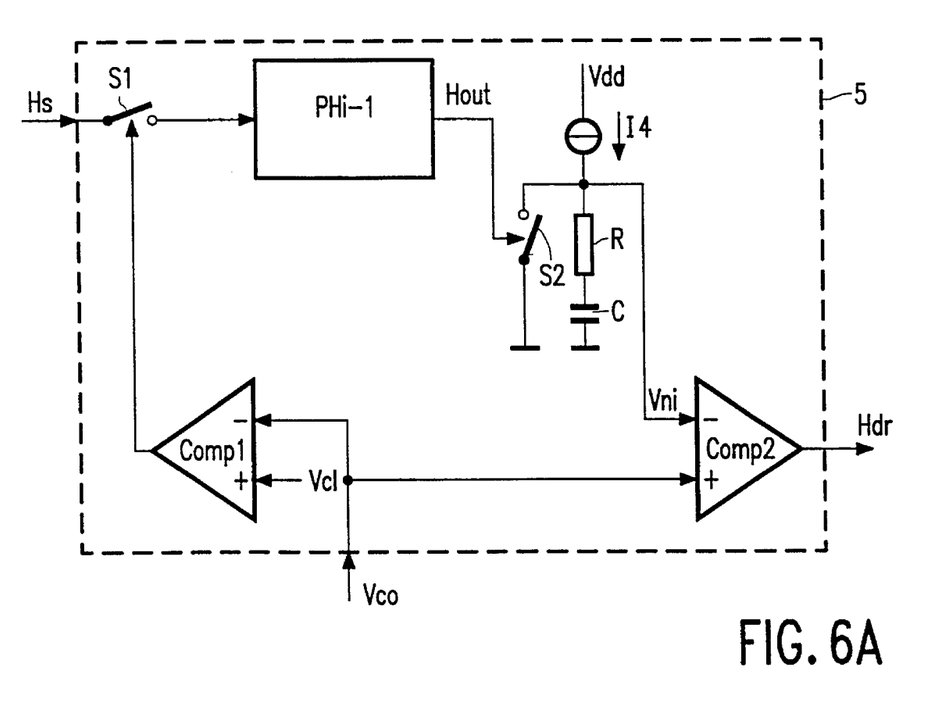
FIG. 6A shows a second embodiment of the drive circuit and FIGS. 6B–6E show some signal diagrams to explain its operation.

FIG. 6A shows a second embodiment of the drive circuit 5. This embodiment generates a drive signal Hdr having a constant repetition frequency. The control signal Vco modulates both an on-time Ton and an off-time Toff of the drive signal Hdr. The horizontal synchronizing pulses Hs are presented to a first switch S1 arranged in series with an input of a phase-locked loop circuit phi-1. The phase-locked loop circuit phi-1 supplies an output pulse Hout for switching a second switch S2. When the switch S1 is closed the known phase-locked loop circuit phi-1 (for example, present in the Philips IC TDA2595) will couple the output pulse Hour in frequency and phase with the horizontal synchronizing pulses Hs applied to the input. When the switch is open, the phase-locked loop circuit phi-1 receives no input pulses and then supplies output pulses Hout having a free-running frequency which is chosen proximate to the nominal horizontal frequency (15625 Hz for PAL systems). The switch S1 is controlled by the output signal of a first voltage comparator Comp1, an inverting input of which receives the control signal Vco and a non-inverting input of which is connected to a first reference voltage Vcl. The control signal Vco is further applied to a non-inverting input of a second voltage comparator Comp2. The inverting input of the second voltage comparator Comp2 is coupled to a junction point of a first terminal of a current source I4, a series arrangement of a resistor R and a capacitor C, and the second switch S2. Second terminals of the switch S2 and the series arrangement of the resistor R and the capacitor C are coupled to ground. A second terminal of the current source I4 is coupled to a voltage Vdd. The inverting input of the second voltage comparator receives a sawtooth signal Vni. The operation of the drive circuit 5 will be explained with reference to an example of a variation of the control signal Vco as shown in FIG. 6B, and the waveform diagrams of the output pulse Hout, the sawtooth signal Vni and the drive signal Hdr in FIGS. 6C to 6E.

Figure 6B:
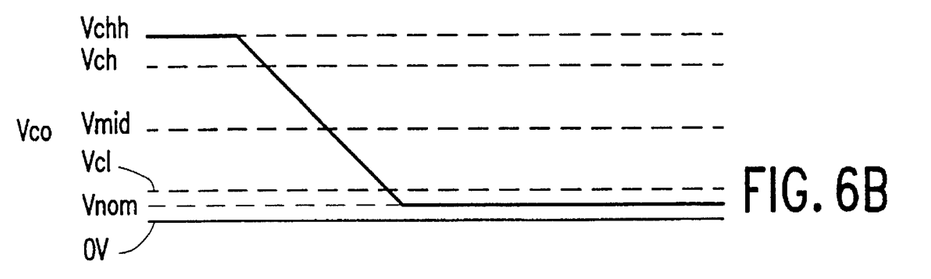

FIG. 6B shows a variation of the control signal Vco as occurs, for example when starting a horizontal deflection circuit, in case the smoothing capacitors Cs, Cf are still uncharged, or without the smoothing capacitors Cs, Cf. The control signal Vco decreases from a maximum voltage Vchh to a nominal voltage Vnom and successively intersects a second reference voltage Vch, a voltage Vmid and the first reference voltage Vcl.

Figure 6C:
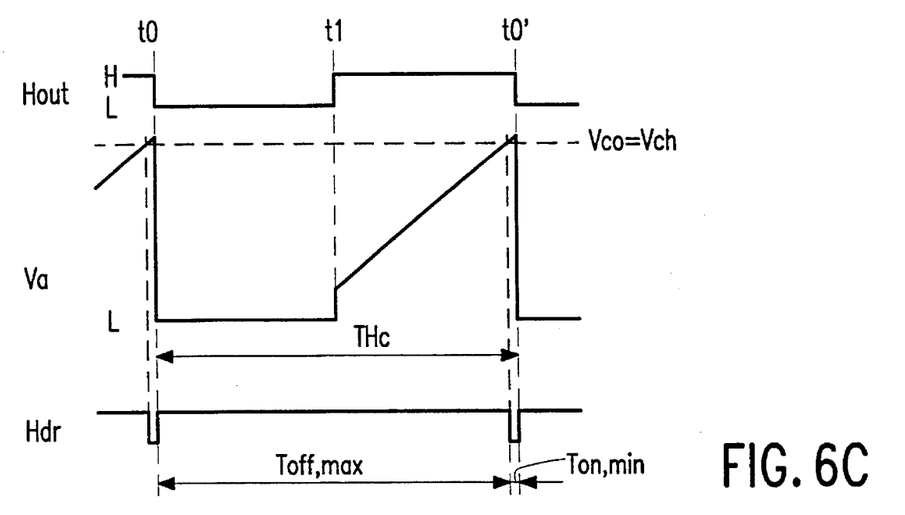

FIG. 6C shows a situation in which the control voltage Vco has a value which is slightly lower than the second reference voltage Vch. The switch S1 is open, with the output signal Hout having a nominal (free-running) repetition frequency. At the instant t0 the output signal Hour assumes the low level L and the second switch S2 is closed, with the sawtooth signal Vni becoming low. At the instant t1 the output signal Hout assumes a high level and the second switch S2 opens. The current source I3 will charge the capacitor C until the second switch S2 is closed again at the instant t0'. Since the capacitor C is not completely discharged by the resistor R during the period of time t1-t0, there will be a jump in the sawtooth signal Vni at the instant t1. By comparing the control signal Vco with the sawtooth signal Vni by means of the second voltage comparator Comp2, a drive signal Hdr is obtained which has a low level L during the time when the control signal Vco has a lower value than the sawtooth signal Vni. In the situation shown in FIG. 6c, the drive signal Hdr has a fixed period duration THc, a minimum on-time Ton,rain and a maximum off-time Toff, max.

Figure 6D:
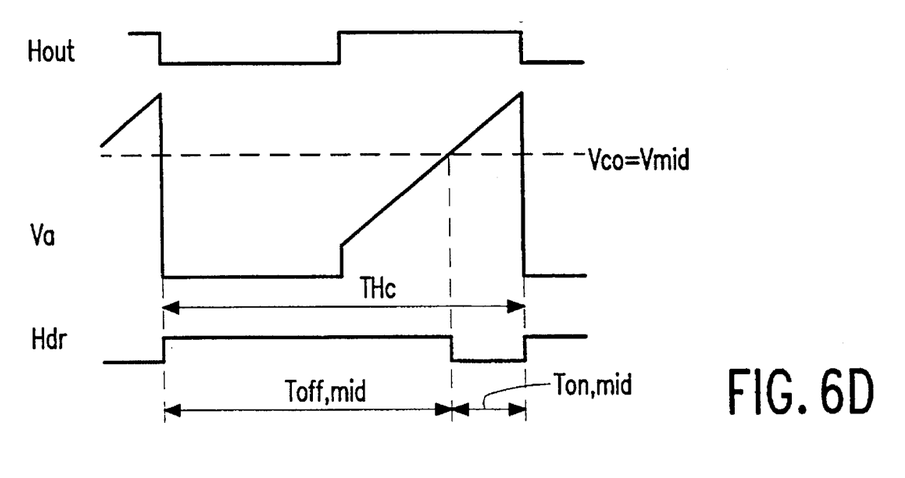

FIG. 6D shows a situation in which the control voltage Vco has a value which is equal to the voltage Vmid and the switch S1 is open. Similarly as described with reference to FIG. 6C, it can be seen that the drive signal Hdr has a fixed period duration THc, an on-time Ton,mid and an off-time Toff, mid.

Figure 6E:
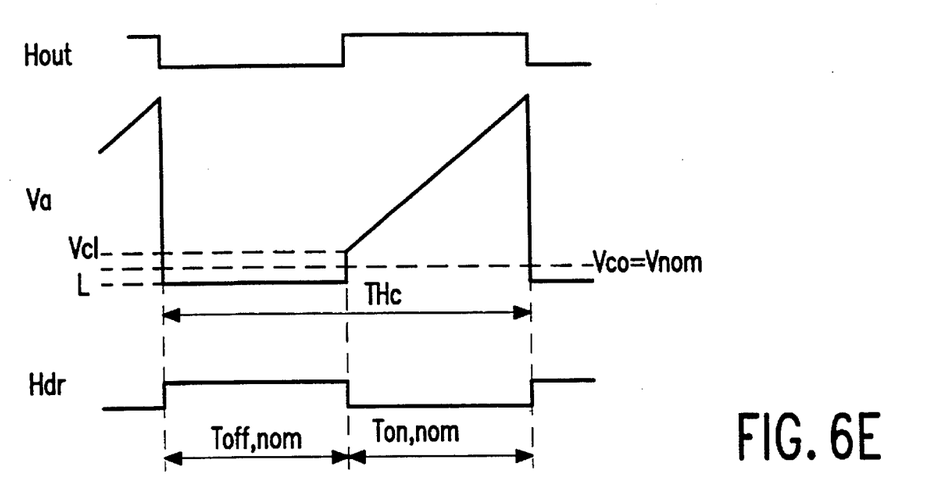

FIG. 6E shows a situation in which the control voltage Vco has a value which is equal to (or lower than) the first reference voltage Vol. Similarly as described with reference to FIG. 6C, it can be seen that the drive signal Hdr has a fixed period duration THc, a nominal on-time Ton,nom and a nominal off-time Toff,nom. Since the control signal Vco has now reached a value below the first reference voltage Vcl, the switch S1 will be closed via the first voltage comparator Comp1 and the horizontal deflection circuit has reached its normal operating situation. As long as the control signal Vco has a value below the first reference voltage Vcl, the duty cycle dc will not be influenced. In normal operation, a small ripple voltage which is present on the control signal Vco will not have any influence on the duty cycle. Moreover, in normal operation it is possible to eliminate the influence of the feedback paths on the duty cycle control circuit 3 by separating, for example the current sources IS1, IS2 in the duty cycle control circuit from the control signal Vco so that disturbances produced by ripple voltages on the scan and fly-back voltages Vsca, Vfly are prevented.

We claim:

1. A horizontal deflection circuit for a picture display apparatus, comprising:

a horizontal output stage provided with a switching element which is coupled to a horizontal output transformer for generating at least one voltage; and a drive circuit for generating a drive signal for switching the switching element, and provided with a duty cycle control circuit for modulating a duty cycle of the drive signal during changes of state of the horizontal deflection circuit, characterized in that the horizontal deflection circuit is provided with change detector means coupled to an output of the horizontal output stage for receiving a DC signal which varies during said changes of state, said change detector means having an output for supplying an output signal which is a measure of a rate of change of the DC signal, the output of the change detector means being coupled to the duty cycle control circuit for applying a control signal for modulating the duty cycle.

2. A horizontal deflection circuit as claimed in claim 1, characterized in that the DC signal is related to at least a scan voltage generated by the horizontal output transformer.

3. A horizontal deflection circuit as claimed in claim 1, characterized in that the DC signal is related to at least a fly-back voltage generated by the horizontal output transformer.

4. A horizontal deflection circuit as claimed in claim 2, characterized in that the change detector means is further provided with a threshold circuit coupled to an input of the change detector means.

5. A horizontal deflection circuit as claimed in claim 4, characterized in that the threshold circuit comprises a zener diode.

6. A horizontal deflection circuit as claimed in claim 2, characterized in that said change detector means comprises a plurality of change detectors, and each change detector comprises a capacitor.

7. A horizontal deflection circuit as claimed in claim 3, characterized in that the change detector means is further provided with a threshold circuit coupled to an input of the change detector means.

8. A horizontal deflection circuit as claimed in claim 7, characterized in that the threshold circuit comprises a zener diode.

9. A horizontal deflection circuit as claimed in claim 3, characterized in that said change detector means comprises a plurality of change detectors, and each change detector comprises a capacitor.

10. A method of horizontally deflecting a cathode ray of a picture display screen by means of a switching element which is coupled to a horizontal output transformer for generating scan and/or fly-back voltages, said method comprising the steps:

generating a drive signal for the switching element; and modulating a duty cycle of the drive signal during changes of state of the horizontal deflection, characterized in that the step of modulating a duty cycle comprises modulating the duty cycle during one of the changes of state with a control signal which is generated in dependence upon a rate of change of a DC signal which, in turn, is dependent on at least one of said scan and fly-back voltages, said DC signal varying during said changes of state.

11. A picture display apparatus comprising an input terminal for receiving a video signal, means for separating horizontal synchronizing pulses which are presented to a horizontal deflection circuit provided with a drive circuit for generating a drive signal for switching a switching element, and a horizontal output stage provided with the switching element to ensure a horizontal deflection of a picture display screen, the drive circuit being provided with a duty cycle control circuit for modulating a duty cycle of the drive signal during changes of state of the horizontal deflection circuit, characterized in that the horizontal deflection circuit is provided with change detector means coupled to an output of the horizontal output stage for receiving a DC signal which varies during one of the changes of state, said change detector means having an output for supplying an output signal which is a measure of a rate of change of the DC signal, said output of the change detector means being coupled to the duty cycle control circuit for applying a control signal to a control input of the duty cycle control circuit for modulating the duty cycle.

* * * * *